US006487960B1

(12) United States Patent
Chatufale

(10) Patent No.: US 6,487,960 B1
(45) Date of Patent: Dec. 3, 2002

(54) HYDRAULIC FAILSAFE VALVE ACTUATOR

(75) Inventor: Vijay Chatufale, Missouri City, TX (US)

(73) Assignee: HP&T Products, Inc., Stafford, TX (US)

( * ) Notice: Subject to any disclaimer, the term of this patent is extended or adjusted under 35 U.S.C. 154(b) by 0 days.

(21) Appl. No.: 09/925,435

(22) Filed: Aug. 9, 2001

(51) Int. Cl.[7] .......................... F16J 15/18; F15B 15/24; F01B 31/00

(52) U.S. Cl. ..................... 92/165 R; 92/13.6; 92/130 A

(58) Field of Search ............................ 92/13.6, 51, 52, 92/107, 108, 113, 114, 130 A, 165 R

(56) References Cited

U.S. PATENT DOCUMENTS

| | | | | | |
|---|---|---|---|---|---|
| 1,625,751 | A | * | 4/1927 | Solberg | 92/165 R X |
| 1,755,403 | A | * | 4/1930 | Manley | 92/114 X |
| 3,003,469 | A | * | 10/1961 | Kelsey, Jr. | 92/113 |
| 3,731,596 | A | * | 5/1973 | Burgdorf | 92/52 |
| RE30,115 | E | | 10/1979 | Herd et al. | |
| 4,213,480 | A | | 7/1980 | Orum et al. | |
| 4,650,151 | A | | 3/1987 | McIntyre | |
| 4,744,386 | A | | 5/1988 | Frazer | |
| 5,953,967 | A | * | 9/1999 | Junkers et al. | 92/52 X |
| 6,041,804 | A | | 3/2000 | Chatufale | 92/13.6 X |

OTHER PUBLICATIONS

Simply Superior, sales brochure for "Magnum Gate Valve", unknown publisher and date, 1 page.

Cameron Iron Works, Inc., sales brochure for "Hydraulically Actuated Gate Valve", SD–156, unknown publisher and date, 1 page.

Cameron Iron Works, Inc., sales brochure for "Hydraulically Actuated Gate Valve", SD–2337–01, unknown publisher and date, 1 page.

Anson, sales brochure for "Hydraulically Actuated Gate Valves", unknown publisher and date, 2 pages.

* cited by examiner

*Primary Examiner*—John E. Ryznic
(74) *Attorney, Agent, or Firm*—Slater & Matsil, LLP

(57) ABSTRACT

A hydraulic actuator for operating a gate valve. The actuator includes a stationary piston coupled to an actuator housing and a moveable cylinder disposed proximate the piston exterior surface. The piston includes a hollow interior portion adapted to house a manual override mechanism. The piston includes a hydraulic pressure line extending between the piston bottom surface and the side of a cap region in the piston. The manual override mechanism includes an override stem disposed within the piston interior portion, the override stem abutting the cylinder. An optional visual indicator stem may be disposed within the piston, coupled to the cylinder

33 Claims, 5 Drawing Sheets

HYDRAULIC FAILSAFE VALVE ACTUATOR

TECHNICAL FIELD

The present invention relates generally to equipment used in oilfield and, more particularly, to a valve actuator and method of manufacturing thereof.

BACKGROUND

Various types of valves are used in oilfield well exploration, drilling, and production equipment. Valves are coupled to a pipeline and are typically used to shut off or turn on the flow of a fluid, such as a liquid, gas or both. Valves are typically either unidirectional or bi-directional.

A gate valve is a type of valve that includes a substantially rectangular-shaped gate that is moved by an operator in and out of the valve body to control the fluid. Gate valves generally comprise a valve body having a central axis aligned with inlet and outlet passages, and a space between the inlet and outlet passages in which a substantially rectangular slide or gate may be moved perpendicular to the central axis to open and close the valve. In the closed position, the gate surfaces typically seal against sealing rings which surround the fluid passage through the valve body.

Gate valves are used to control the flow of a variety of fluids. Often the fluid to be controlled by the gate valve is under pressure. In the petroleum industry, gate valves are used along pipeline at various locations. The operator used to move a valve gate in and out of the valve body may be manual or may be actuated hydraulically, pneumatically or electrically, for example. Hydraulic gate valve actuators may include fail-safe features, to cause the gate to be closed (fail safe closed—FSC) or open (fail safe open—FSO) if the valve fails.

SUMMARY OF THE INVENTION

Embodiments of the present invention achieve technical advantages as an actuator for a gate valve having a failsafe mechanism.

In one embodiment, disclosed is a hydraulic actuator for a gate valve, comprising an actuator housing having a top portion and a bottom portion, a stationary piston being fixedly coupled to the actuator housing top portion. The piston includes an exterior surface, a bottom surface, and an upper cap region having a side. A hollow cylinder is disposed within the actuator housing proximate the piston exterior surface, the cylinder including an exterior surface and an exterior upper region, the cylinder including a shoulder at the exterior upper region. A hydraulic pressure line is disposed within the stationary piston, the hydraulic line extending between the piston bottom surface and the piston cap region side. An operating stem is coupled to the cylinder, the operating stem being disposed within the actuator housing bottom portion, wherein the operating stem is controllably coupleable to a gate valve.

In another embodiment, disclosed is a hydraulic actuator for a gate valve, comprising an actuator housing, a stationary piston fixedly coupled to the actuator housing top portion, the piston having a hollow interior portion. A hollow cylinder is disposed within the actuator housing proximate the piston exterior surface, the cylinder including a shoulder at the exterior upper region. An operating stem is coupled to the cylinder, the operating stem being disposed within the actuator housing bottom portion, wherein the operating stem is controllably coupleable to a gate valve.

Further disclosed is an override mechanism for a hydraulic actuator having a stationary piston, the piston including a hollow interior portion and an upper cap portion, the piston upper cap portion fixedly coupled to an actuator housing, the actuator including a hollow moveable cylinder disposed proximate the piston exterior surface. The override mechanism comprises an override stem disposed within the piston interior portion, where the override stem abuts the cylinder.

Also disclosed is a method of manufacturing a hydraulic actuator for a gate valve.

Advantages of embodiments of the invention include providing an actuator design that is smaller and more light-weight than prior art actuators. A built-in manual override mechanism may be disposed within a stationary piston. The moveable cylinder may include a built-in quick disconnect mechanism. A visual indicator stem may be coupled to the cylinder. The hydraulic port enters the piston from the side, freeing the interior portion of the piston to house other components of embodiments of the invention.

BRIEF DESCRIPTION OF THE DRAWINGS

The above features of embodiments of the present invention will be more clearly understood from consideration of the following descriptions in connection with accompanying drawings in which.

Corresponding numerals and symbols in the different figures refer to corresponding parts unless otherwise indicated. Components are shown in substantially conceptual form for ease of explanation and are not intended to represent manufacturing dimensions, sizes or details. The dimensions may be exaggerated to more clearly shown the features of discussion.

DETAILED DESCRIPTION OF PREFERRED EMBODIMENTS

A prior art actuator will be described, followed by a description of some preferred embodiments of the present invention and some advantages thereof.

Figure 1:
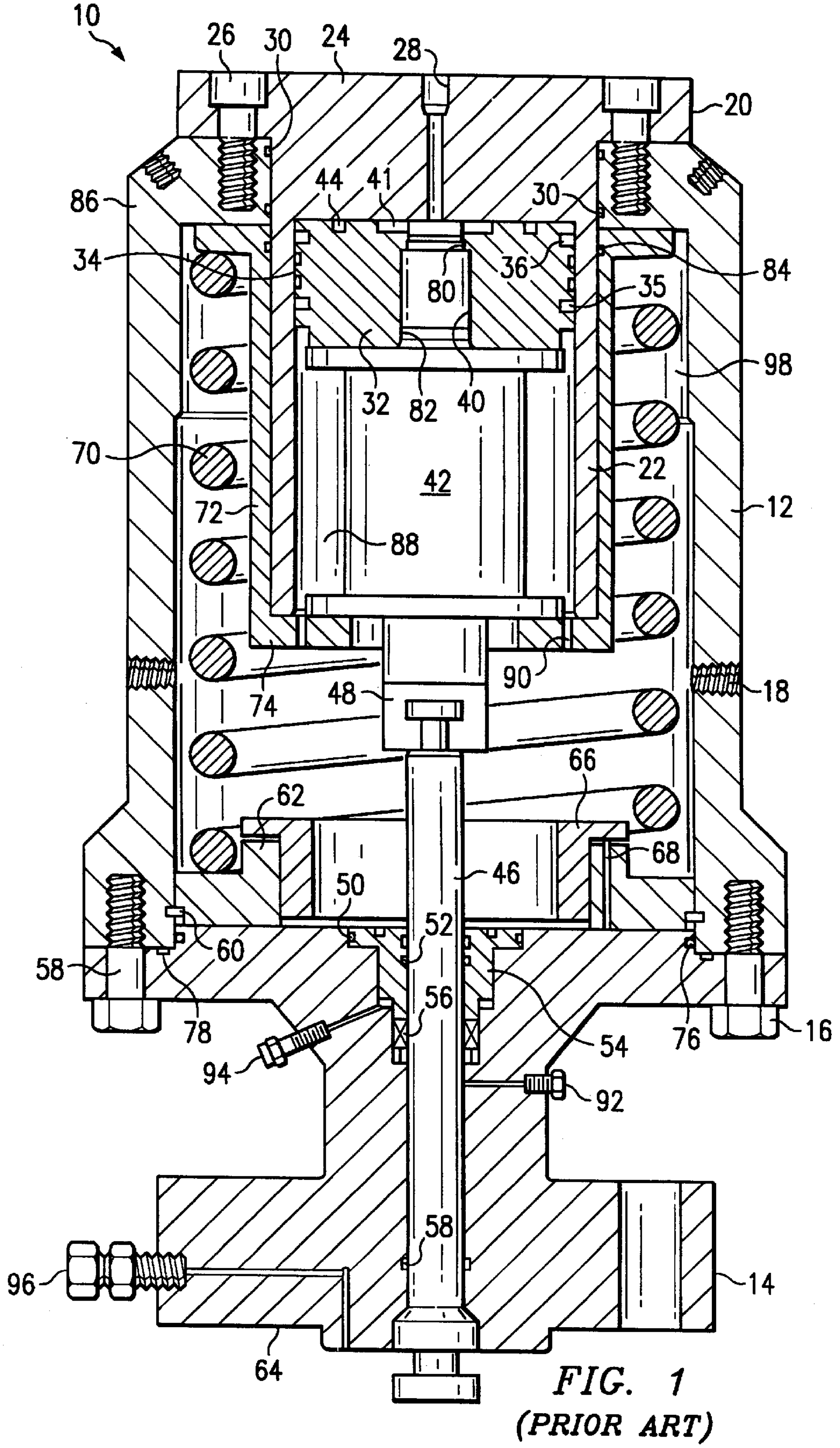
FIG. 1 (PRIOR ART)
FIG. 1 illustrates cross-sectional view of a portion of a prior art subsea hydraulic actuator assembly.

An exemplary type of gate valve actuator 10 is shown in the prior art drawing of FIG. 1. FIG. 1 shows a cross-sectional view of a portion of the subsea hydraulic actuator assembly described in U.S. Pat. No. 6,041,804, issued Mar. 28, 2000, to Vijay R. Chatufale, which is incorporated herein by reference.

FIG. 1 shows an actuator housing 12 removeably connected to gate valve bonnet 14 preferably by hex head bolts 16. Hydraulic ports 18 are formed in actuator housing 12. The assist line hydraulic fluid is connected to an internally positioned hydraulic cylinder 20 that is monolithically formed along with cap portion 24. Cap portion 24 supports cylinder portion 22 within actuator housing 12. Hydraulic cylinder 20 may be removed by removing socket head screws 26. Hydraulic control port and line 28 is also drilled into cap portion 24 and provides the connection to the external hydraulic control line (not shown) used to operate, either open or close, the gate valve. The prior art actuator 10 is adapted to operate at a subsea operating pressure of about 3000 p.s.i. pressure above the hydrostatic head pressure.

Hydraulic cylinder 20 seals the top portion of actuator housing 12 with seals 30 around cap portion 24 that inserts into the top portion of actuator housing 12. Hydraulic piston 32 slidably moves within hydraulic cylinder 20 and is mounted on wear ring 34. Lower piston seal 35 provides a seal for pressure acting on piston 32 due to assist line hydraulic force. Upper piston seal 36 provides a seal for pressure acting on piston 32 due to control line hydraulic force.

Driving stem 42 is removably secured to hydraulic piston 32 by threads 40 and retainer ring 41. Driving stem 42 may be disconnected from either hydraulic piston 32 or valve stem 46 without having to remove high tension spring 70. Once hydraulic cylinder 20 is removed after unscrewing the plurality of screws 26, then hydraulic piston 32 can be removed by disconnecting it from driving stem 42, i.e., removing retainer ring 41 and threadably rotating hydraulic piston 32 which rotation can be accomplished using removal grip holes 44 in the top of the piston. If maintenance is to be on a seal adjacent bonnet 14 and it is desired to leave hydraulic cylinder 20 in place, then bolts 16 are removed and quick disconnect 48 allows removal of substantially the entire subsea actuator 10 from bonnet 14. The various stem seal elements include stem seal 52, packing gland 54, packing gland seal 50, and packing assembly 56. Upper and lower wear rings 58 are provided along valve stem 46 so that metal-to-metal contact wear does not occur when valve stem 46 is operated. Drift adjustment 66 is threadably adjustable to eliminate any drift variations. Once the drift adjustment is set, typically by using a drift gauge that is designed for the valve, then several lock screws, such as lock screw 68 may be used to affix the position of drift adjustment 66. Drift adjustment mechanism 66 operates by providing a stop to limit the stroke length of subsea actuator 10 as the spring 70 is compressed along with spring lifter 72 until spring lifter cup bottom 74 abuts drift mechanism 66. Driving stem 42 includes an upper seal 80 for sealing hydraulic control pressure and a lower seal 82 for sealing assist hydraulic pressure.

Spring lifter 72 utilizes wear ring 84 upon which spring lifter is telescopically movable with respect to hydraulic cylinder 20 at end portion 22. Spring lifter 72 includes a lip section 86 to support subsea tension spring 70. Spring lifter 72 includes ports 90. Bleeder plug 92 is adapted to bleed off pressure within bonnet 14 and below stem seal 52. Relief valve 94 vents pressure that may develop around packing gland 54. Grease fitting 96 may be used as desired to inject grease or other sealing fluid into bonnet 14 of the gate valve. Other elements 54, 58, 60, 62, 64, 76, 78, 84, 98 are coup led and function as described in the patent.

In operation, hydraulic fluid enters control port 28 to pressurize hydraulic piston 32 to move downwardly. As hydraulic piston 32 moves downward, it also moves driving stem 42 downwardly that contacts spring lifter cup bottom 74 and there moves spring lifter 72 downwardly so compressing spring 70 by means of spring lifter flange or lip 86. Hydraulic fluid is exhausted from cylinder 88 through ports 90 and from actuator housing hydraulic assist ports 18. The stroke is stopped and the gate valve is precisely open when spring lifter cup bottom 74 contacts drift adjustment 66. Various hydraulic controls may be used to provide assist hydraulic fluid pressure to close the valve in the opposite manner. High tension spring 70 operates to close the valve by pressing upwardly against lip 86 to move driving stem 42 and hydraulic piston 32 upwardly, to close the valve.

The hydraulic valve actuator 10 of FIG. 1 is adapted for subsea applications. However, a problem with the prior art actuator 10 of FIG. 1 is that there is a large amount of dead space within the cylinder 20. Also, the piston 32 and drive stem 42 are relatively large elements that are disposed within and are adapted to move up and down within cylinder 20. These elements require much space and weight, which is often limited or restricted in oil production and exploration rigs.

These and other problems found in prior art valve actuators can be alleviated by the use of preferred embodiments of the present invention.

Figure 2:
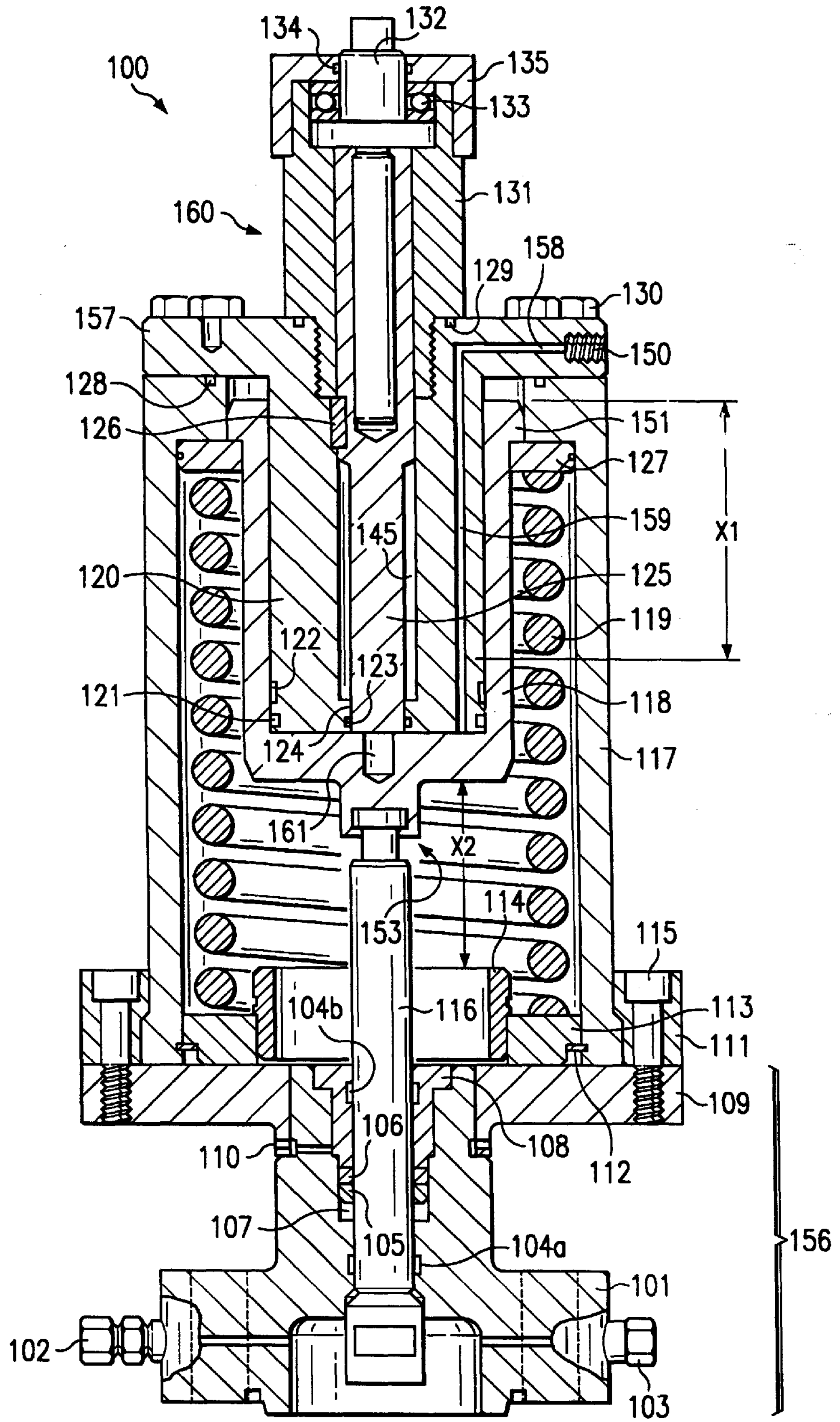
FIG. 2 shows a cross-sectional view of a hydraulic valve actuator in accordance with an embodiment of the present invention having a stationary piston and a manual override mechanism disposed within the stationary piston.

FIG. 2 illustrates a cross-sectional view of an actuator 100 in accordance with a preferred embodiment of the present invention. The actuator 100 comprises an actuator housing 117, a bonnet assembly 156 and a piston 120 that is stationary with respect to the actuator housing 117 and includes a built-in manual override mechanism 160. A moveable cylinder 118 includes a hole 161 tapped therein adapted to receive a visual indicator stem, not shown in FIG. 2.

Actuator housing 117 is coupled at a lower end to bonnet assembly 156. The terms lower and upper are used with reference to the figures merely to facilitate the description thereof, although the actuator 100 may be positioned in any direction. Actuator housing 117 preferably is cylindrical and is preferably comprised of steel, for example, although other shapes and materials may be utilized. Bonnet assembly 156 includes a bonnet 101 adapted to couple the actuator 100 to a gate valve (not shown) and an annular bonnet ring 109. Actuator housing 117 is preferably coupled to bonnet assembly 156 by housing retainer 111 which is preferably annular and includes a plurality e.g. three or more, holes adapted to accommodate cap screws 115, as shown.

Housing retainer 111 preferably has a narrower inner annular diameter near the top than at the bottom. Actuator housing 117 preferably has a narrower exterior diameter near the top, corresponding with housing retainer 111 narrower inner annular diameter, and also has a wider exterior diameter near the bottom, corresponding with housing retainer 111 wider inner annular diameter, as shown. The housing retainer 111 and actuator housing 117 diameter differences function to securely couple the actuator housing 117 to the bonnet assembly 156. Alternatively, the actuator housing 117 may be coupled to the bonnet assembly 156 by other means, such as a built-in screw assembly within the actuator housing, as shown in the prior art drawing of FIG. 1, as an example.

Actuator housing 117 is coupled at an upper end to piston 120 having a cap portion 157. Piston 120 is preferably cylindrical and is adapted to remain fixed to, or stationary with respect to, the actuator housing 117 during the operation of the actuator 100, e.g. the piston is stationary and does not move up and down. A seal ring 128 may be disposed between the actuator housing 117 and the piston cap portion 157, as shown. Seal ring 128 preferably comprises an O-ring comprised of rubber selected for the pressure requirements of the particular applications and alternatively comprises other elastic organic materials, as examples. Piston 120 is adhered to the actuator housing by a securing mechanism which may comprise a hex bolt 130.

A cylinder 118 having an annular step or shoulder 151 at the upper exterior thereof is coupled within actuator housing 117. Cylinder 118 preferably comprises steel, is preferably hollow to accommodate the exterior diameter of piston 120, and is coupled at a lower end by a quick-disconnect 153 to an operating stem 116. Cylinder 118 is adapted to couple to a top portion of the actuator housing interior by spring plate 127. A spring 119 is coupled within actuator housing 117 disposed about the exterior of cylinder 118 between spring plate 127 and drift ring base 113. A retainer ring 112 comprising steel, as an example, is disposed between the actuator housing 117 interior and the drift ring base 113 exterior. A drift ring 114 is coupled to and disposed within drift ring base 113. Drift ring 114 may comprise steel, for example, and is used as a down stop for the moving cylinder 118. The drift ring 114 allows the adjustment of the stroke of any given gate valve. A stroke comprises the distance through which a gate of the gate valve moves from "full open" through a "fall closed" position.

To activate the fail-safe actuator, hydraulic pressure is introduced between piston 120 and cylinder 118 through hydraulic port and line 150 disposed within stationary piston 120. Hydraulic port and line 150 is advantageously disposed within and enters piston 120 from the side or laterally as shown, leaving the interior region of the piston 120 free to house other elements of embodiments of the invention, to be described further herein. Hydraulic port and line 150 includes a first portion 158 comprising an opening to exterior of the piston cap portion 157 and a second portion 159 having an opening that enters the cavity between the piston 120 and the cylinder 118.

The hydraulic port and line 150 first and second portions 158/159 are preferably positioned about 90 degrees with respect to one another within the stationary piston 120. The hydraulic port and line 150 may be formed by drilling a first hole from the piston 120 cap portion 157 side to form the first portion 158 and by drilling a second hole from the piston 120 bottom to form the second portion 159, the first and second holes being joined within piston 120 to form a single tubular-shaped line 150, for example. The first and second portions 158/159 are preferably positioned at 90 degree angle to one another, and alternatively, first and second portions 158/159 may be positioned at other angles to one another, e.g. 90 +/−35 degrees, as an example. The hydraulic port and line 150 first portion 158 may be tapped to produce a threaded port connection accessible externally to the actuator 100, for example.

When hydraulic pressure is introduced through hydraulic port and line 150, cylinder 118 is forced downwards towards the bottom, towards the bonnet assembly 156. As the cylinder 118 is lowered, the step 151 on the upper exterior of cylinder 118 abutting spring plate 127 exerts a downward force on spring 119. Spring 119 is compressed as the cylinder 118 and spring plate 127 are lowered. Cylinder 118 is fixedly coupled by quick-disconnect 153 to operating stem 116, and therefore operating stem 116 is lowered as the cylinder 118 and spring plate 127 are lowered. Lowering the operating stem 116 lowers the valve gate coupled to the operating stem 116 lower portion (not shown), either opening or closing the valve, depending on the valve design.

The actuator 100 includes a plurality of seals adapted to seal the various elements of the actuator 100 to one another. A seal ring 121 is preferably coupled to the bottom of piston 120 having an exterior accommodating annular groove therein. The seal ring 121 is disposed between the exterior of piston 120 and the interior of the cylinder 118. Seal ring 121 preferably comprises an O-ring comprised of an organic elastomeric material, such as rubber, as an example. Seal ring 121 provides a seal between piston 120 and cylinder 118 such that when hydraulic pressure is introduced through hydraulic line and port 150, the cylinder 118 is forced downwardly towards the bonnet assembly 156, as described above. A wear ring 122 is also preferably disposed between the piston 120 and the cylinder 118. The piston 120 preferably includes an exterior annular groove to accommodate the wear ring 122. Wear ring 122 preferably comprises nylon, for example, and may alternatively comprise reinforced nylon such as Molygard™ . Wear ring 122 is adapted to prevent metal-to metal contact of the piston 120 and cylinder 118.

An embodiment of the bonnet assembly 156 will next be described. Bonnet 101 is adapted to be coupled to bonnet ring 109. Bonnet ring 109 is removeably coupled to actuator housing 117 preferably by means of housing retainer 111. Cap screws 115 preferably comprise hex head bolts, although other removable fasteners, such as various types of bolts or clamps may also be used to couple actuator housing 117 to bonnet ring 109. A packing gland 108 is disposed between operating stem 116 and bonnet 101. Packing gland 108 preferably comprises steel, for example. Wear rings 104a and 104b are preferably disposed between operating stem 116 and packing gland 108.

The operating stem 116 is disposed within the bonnet, as shown. The operating stem 116 is adapted to couple to a gate valve at the lower end. Bonnet 101 includes a grease fitting 102 preferably comprising steel, for example. Grease fitting 102 is coupled to Bonnet 101. Bonnet 101 also includes a bleeder plug 103. The bonnet assembly 156 also preferably includes a set screw 110. The bonnet assembly 156 preferably includes a packing 105, backup ring 106, a packing hat ring 107 disposed between the bonnet 101 and the operating stem 116, as shown, which elements are adapted to seal the lower part of the operating stem 116 of the actuator 100.

In one embodiment, the piston 120 includes an interior hollow region 145. The hollow piston 120 is adapted to contain a manual override mechanism 160 disposed within the central hollow region 145 thereof. The manual override mechanism 160 includes an override stem 125 disposed within the piston 120 interior portion, the override stem 125 abutting the cylinder 118 bottom inner surface. The override stem 125 preferably comprises steel, for example. When the override mechanism 160 is activated, the override stem 125 is lowered, forcing down cylinder 118 to open or close the valve. The override stem 125 is preferably threaded on the interior to couple to locking screw 132, to be described further herein.

The manual override mechanism 160 includes a bearing housing 131 coupled to the piston 120 cap portion 157. A bearing cap 135 is preferably coupled to bearing housing 131. Bearing housing 131 and bearing cap 135 preferably comprise steel, for example.

The manual override mechanism 160 includes a locking screw 132 coupled to the override stem 125 and the bearing housing 131. The locking screw 132 may be turned by a user to activate the manual override mechanism 160. The locking screw 132 preferably comprises steel, for example. The locking screw 132 may include a handle or wheel, not shown, for gripping the locking screw 132 while turning. The locking screw 132 is preferably threaded on the exterior lower portion for engaging with the interior threaded portion of override stem 115.

A plurality of bearings 133 are coupled between the bearing housing 131 and the locking screw 132. The bearings 133 preferably comprise steel, for example. The bearings 133 bear a portion of the load required to turn the locking screw 132, making it easier for a user to activate the manual override mechanism.

A key 126 is preferably disposed between the override stem 125 and the piston 120 interior portion. The key 126 prevents the rotation of stem 125, so that stem 125 will be lowered to activate the manual override mechanism 160. The key 126 preferably comprises steel, for example.

Several seal rings are preferably utilized between the manual override mechanism 160 to seal the various elements. Seal ring 134 may be disposed between the bearing cap 135 and the locking screw 132 upper region. Seal ring 129 may be disposed between the piston cap portion 157 interior and a lower edge of bearing housing 131. Seal ring 123 may be disposed between the stationary piston 120 and override stem 125 at a lower region of the override stem 125. A backup ring 123 may be disposed near seal ring 123 disposed between piston 120 and override stem 125. Seal rings 134, 129, 123 and backup ring 123 preferably comprise rubber material such as nitrile and Viton™, as examples.

Preferably, the actuator 100 is designed such that the distance XI traversed by cylinder 118 along piston 120 is sufficient to open or close the valve, and does not extend beyond wear ring 122 and/or seal ring 121. Spring 118 elasticity may be selected to achieve this, and the dimensions of the cylinder 120 and spring 118 may also be chosen accordingly.

When the actuator 100 is in the position shown in FIG. 2, no hydraulic pressure has been introduced into port 150 and the manual override mechanism 160 has not been activated and the actuator is in a first position. The first position may correspond with a gate valve being open or closed, depending on if the valve is FSO or FSC. However, when either hydraulic pressure is been introduced into port 150, or the manual override mechanism 160 is activated and the actuator is moved to a second position. In the second position, the cylinder 118 is lowered down toward the bottom of the actuator housing 117. The cylinder 118 is lowered a distance X2, also referred to as a stroke. When either hydraulic pressure is removed or the manual override mechanism 160 is deactivated, spring 119 forces cylinder 118 back up to the first position, via spring plate 127 exerting a force on cylinder shoulder 151.

Figure 3:
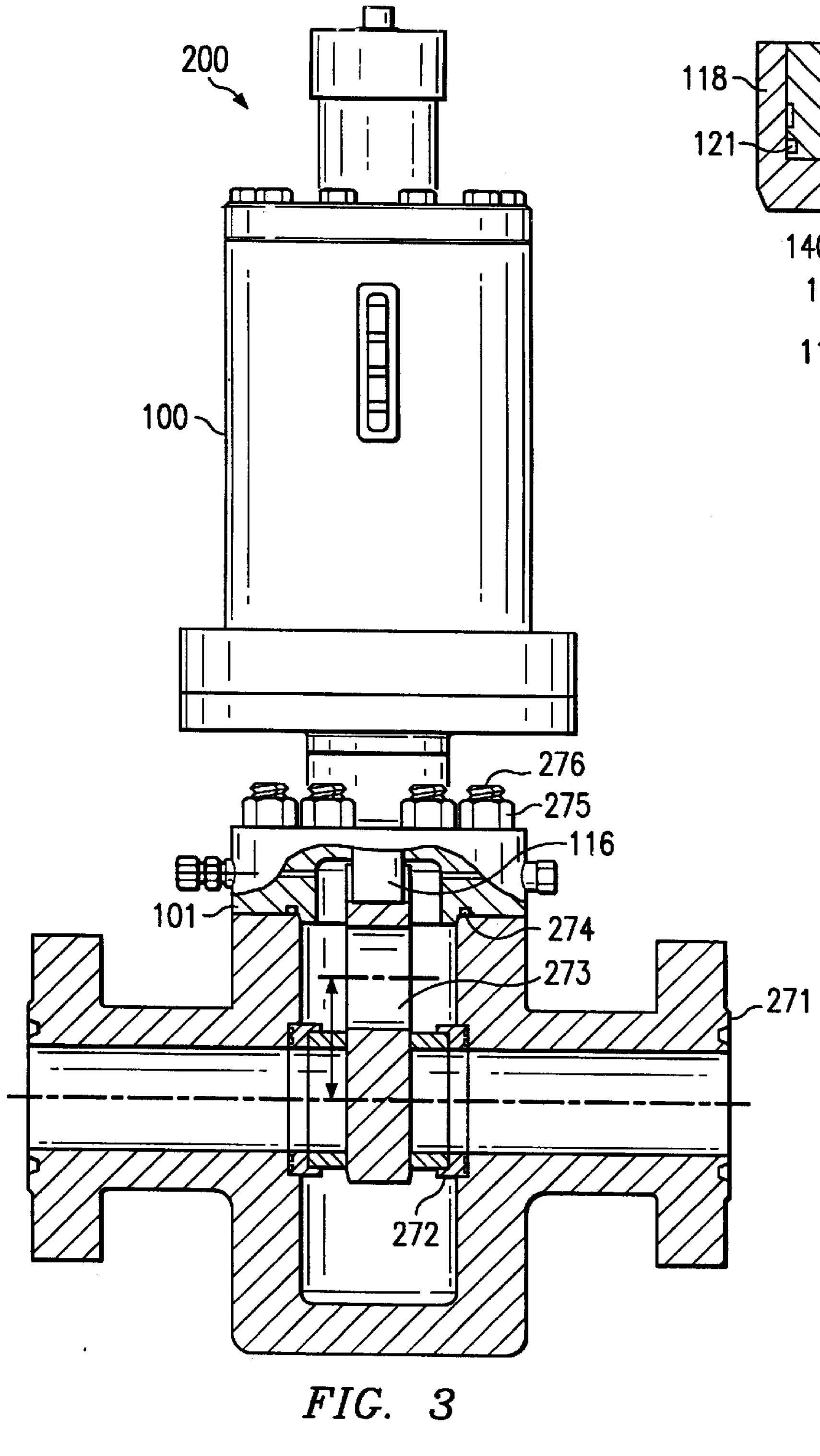
FIG. 3 shows the present actuator in use with a gate valve assembly.

FIG. 3 shows an embodiment of the actuator 100 in use with a gate valve assembly 200. The operating stem 116 lower end of the actuator 100 is coupled to gate 273. A seal assembly 272 is disposed between gate 273 and valve body 271. Bonnet 101 is coupled to valve body 271 by a connecting means, such as a plurality of studs 275 and nuts 276. Bonnet gasket 274 is coupled and provides a seal between bonnet 101 and valve body 271.

Figure 4:
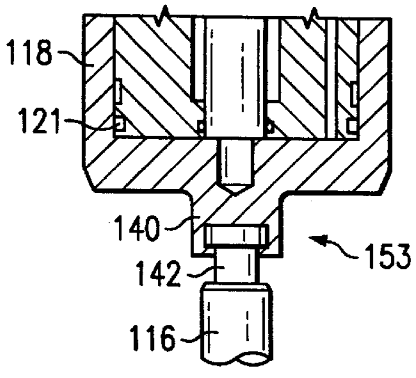
FIG. 4 illustrates a quick-disconnect mechanism of the actuator coupling a cylinder to an operating stem of the valve actuator.
Figure 5:
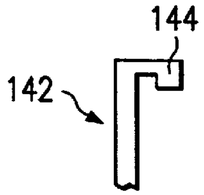
FIG. 5 shows another view of the operating stem portion of the quick-disconnect mechanism.

FIG. 4 illustrates the quick-disconnect mechanism 153 adapted to couple a cylinder 118 to an operating stem 116 of the valve actuator 100. Operating stem 116 preferably includes a T-shaped member 142 coupled to the upper region thereof. Cylinder 118 preferably comprises a receiving member 140 for the operating stem T-shaped member 142. The T-shaped member 142 and receiving member 140 may be separate components or may be integral to the operating stem 116 and cylinder 118, respectively, for example. Preferably, the T-shaped member 142 and receiving member 140 comprise steel, and alternatively, may comprise other metals, as examples. FIG. 5 shows a side view of the T-shaped member 142 rotated 90 degrees, to show hook region 144. Elements 140 and 142 described herein are exemplary, and alternatively, other quick-disconnect mechanisms may be utilized for quick disconnect mechanism 153, for example.

Figure 6:
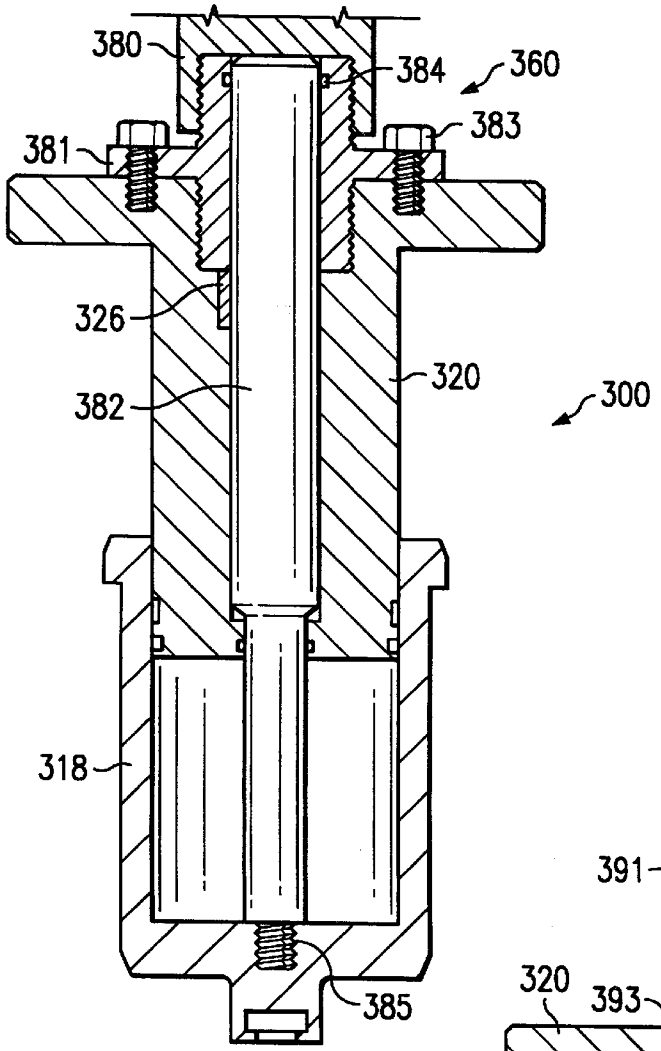
FIG. 6 illustrates a cross-sectional view of an embodiment of the present invention having a manual override mechanism including a lock-open cap adapted to maintain the valve in an open position.

FIG. 6 illustrates a cross-sectional view of an embodiment of the present invention having a manual override mechanism 360 including a lock-open cap 380 adapted to maintain the valve in an open position. A cylinder 318 and piston 320 are shown, the piston 320 including a manual override mechanism 360. Piston 320 is adapted to receive a threaded adapter 381. Adapter 381 is coupled to piston 320, for example, by a plurality of hex head bolts 383. A lock-open stem 382 is disposed within the central region of the piston 120 and cylinder 318. Lock-open stem 382 preferably includes a threaded portion 385 at the lower end thereof, the threaded portion 385 adapted to coupled the lock-open stem 382 the bottom of the cylinder 318. Lock-open cap 380 is threadably coupleable to adapter 381. Seal ring 384 provides a seal between adapter 381 and lock-open stem. Seal ring 384 preferably comprises an O-ring, and the adapter 381, lock-open stem 382 and lock-open cap 380 preferably comprise steel, for example.

Figure 7:
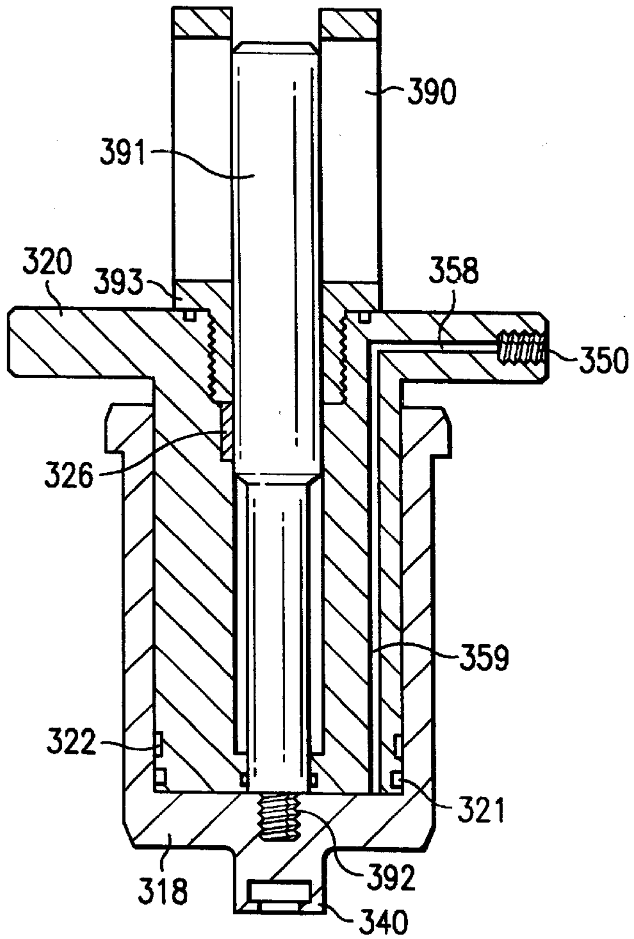
FIG. 7 illustrates a cross-sectional view of an embodiment having an indicator stem and a window for viewing the visual indicator stem position.

FIG. 7 illustrates a cross-sectional view of an embodiment having an indicator stem 391 and a window 390 for viewing the visual indicator stem 391 position. This embodiment may be utilized alone or with other embodiments of the present invention, for example, with a manual override mechanism 160. Window 390 preferably comprises a lower threaded portion adapted to couple to piston 320. Window 390 includes a transparent region so that the position of the visual indicator stem 391 may be viewed by a user. Indicator stem 391 is disposed within piston 320 and is coupled to cylinder 318 by a threaded region that is adapted to couple to cylinder blind tapping hole 392. Note that seal ring 321 is shown as a conventional lip type seal with an O-ring type synthetic rubber O-spring. Seal ring 321 may comprise Polypak™, for example.

Figure 8:
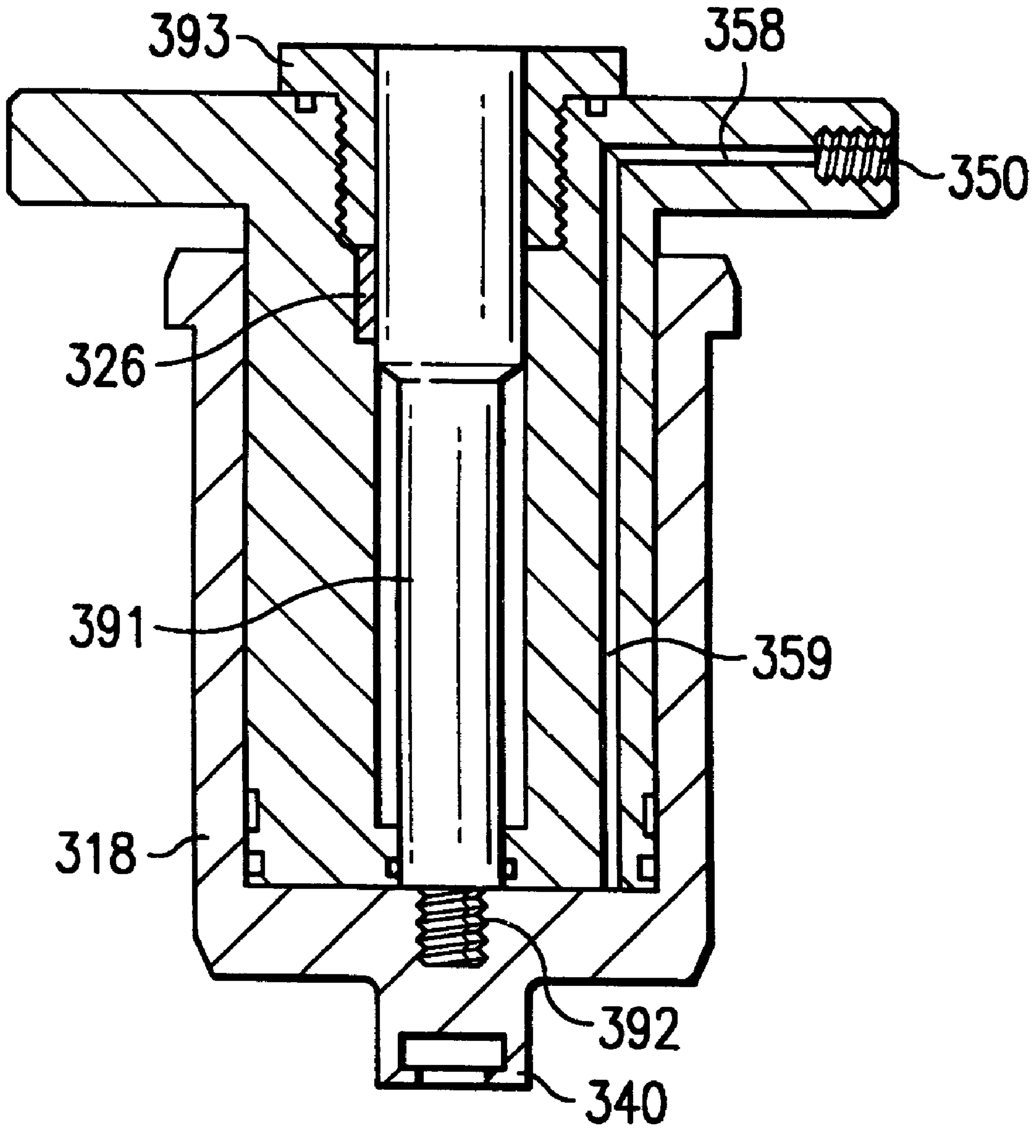
FIG. 8 illustrates a cross-sectional view of an embodiment having a blind plug.

FIG. 8 illustrates a cross-sectional view of an embodiment having a blind plug 393. Blind plug 393 is coupleable to the piston 320, as shown. This embodiment is advantageous because it allows use of the actuator without any kind of accessories. The accessories such as the manual override mechanism 160, lock-open cap 380, indicator stem 391, window 390 and other accessories described herein may be installed in the piston 120/320 when necessary by the user.

The term "failsafe" is used with reference to embodiments of the present invention because of the effects of hydraulic pressure failure that is supplied to the piston 120/320 and cylinder 118/318. The hydraulic pressure failure could be due to the pressure hose being cut during use, the pressure pump ceasing operation, or other reasons, as examples. In these kinds of emergencies, the objective is to close or open the valve depending on whether the valve is FSC or FSO, respectively. As soon as the hydraulic pressure supply is cut off for some reason, the spring 119, and the valve upstream pressure force the gate valve into the final position, either open or closed. Thus, now the gate valve is put into a "desired" position, and any further accident is prevented.

Some advantages of embodiments of the invention will next be described. The actuator 100 has fewer components than the prior art actuator 10 shown in FIG. 1. For example, actuator 100 does not require a driving stem 42 or a spring lifter 72. The driving stem 42 requires a large amount of space and weight, so the present actuator 100 provides a space and weight savings. Because the hydraulic line and port 150 enters the side of the piston 120, the interior region of the piston 120 is free to house the manual override mechanism 160.

The piston 120/320 of embodiments of the hydraulic failsafe spring return actuator described herein includes a one-piece piston and cover design. The piston 120/320 is stationary, whereas the cylinder 118/318 moves or strokes thru the distance X2 as required by the size of the valve. Because the piston 120/320 is stationary, it allows for housing various mechanisms within.

Prior art actuators require an external manual override mechanism, if one is desired. An external manual override requires increased height and space for an actuator. With the manual override mechanism 160 of embodiments of the present invention, the overall height of the actuator 100 is reduced, because most components of this mechanism are housed inside the piston 120. Therefore, every inch of space is used towards the functioning of the actuator 100. The piston 120/320 in embodiments of the present invention is bolted to the actuator housing 117 and hence, advantageously prevents its own rotation e.g., rotation of the piston 120/320 with respect to the locking screw 132. The bolted piston 120/320 allows the manual over-ride mechanism 160 to work. The locking screw 132 tries to rotate the over-ride stem 125, but due to the key 126, the over-ride stem 125 can only translate and not rotate. The key 126 is kept stationary by the piston 120/320. If the piston 120/320 is not bolted, the key 126 will not be stationary, and the manual over-ride mechanism 160 would not function.

An embodiment of the invention includes an indicator stem 391 and window 390 including a stem protector. The indicator stem 391 provides a visual indication of the position of gate, such as ‘Open’ or ‘Closed’.

Another embodiment of the invention includes a lock-open cap 380 and adapter 381 such that the visual stem 382 can be locked in an ‘Open’ position. Another embodiment includes a blind plug 393 that can be fitted into the piston 320.

Embodiments include an integral hydraulic cylinder and quick disconnect device 153. The cylinder 118 becomes the link between the actuator and the valve-operating stem 116. The quick disconnect preferably comprises a T-slot 142 whereby; the actuator assembly can be slid sideways to connect or disconnect from the valve-operating stem.

The cylinder 118 is adapted to create a load in the helical spring. When the cylinder 118 strokes downwards, it moves spring from its preloaded condition thru the stroke of the actuator. This creates additional load, which acts as a potential energy and helps in moving the gate in an upward direction in absence of hydraulic pressure.

When the actuator 100 is loose by itself, both the piston 120 and cylinder 118 can be removed and replaced from top of the actuator. During maintenance of the actuator 100, only two areas need regular maintenance: a change of piston seal and a change of valve stem packing. The change of piston seal can be achieved by removing the piston, changing the seals, and placing the piston back in place. The change of valve stem packing can be achieved by sliding and removing the actuator from valve, removing the packing gland, and replacing the stem packing. In both the change of piston seal and change of valve stem packing, the helical coil spring is always held within the actuator housing. The person doing the maintenance does not even see the spring. Thus, embodiments of the invention are safe and user-friendly.

The quick disconnect mechanism and moveable cylinder 118 provide a less complicated, simple, actuator design having a fewer number of components than prior art actuators. The actuator 100 is easy to handle, and easy to maintain.

The cylinder 118 and quick disconnect mechanism 160 preferably comprise a single integral piece, which avoids additional leakage paths as in some prior art designs and prevents the requirement of additional maintenance.

While embodiments of the invention have been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A fluid actuator, comprising:

an actuator housing having a top portion and a bottom portion;

a stationary piston fixedly coupled to the actuator housing top portion, the piston including an exterior surface, a bottom surface, and an upper cap region having a side;

a hollow cylinder disposed within the actuator housing proximate the piston exterior surface, the cylinder including an exterior surface and an exterior upper region, the cylinder including a shoulder at the exterior upper region;

a hydraulic pressure line disposed within the stationary piston, the hydraulic line extending between the piston bottom surface and the piston cap region side; and an operating stem coupled to the cylinder, the operating stem being disposed within the actuator housing bottom portion.

2. The actuator according to claim 1, further comprising:

a spring disposed around the cylinder exterior surface within the actuator housing;

a spring plate coupled between the spring and the cylinder shoulder; and a bonnet assembly coupled to the actuator housing lower portion.

3. The actuator according to claim 1, wherein the hydraulic line includes a first portion and a second portion, the first and second portions being disposed with respect to one another at an angle of between about 55 and 125 degrees.

4. The actuator according to claim 1, wherein the piston comprises a hollow interior portion.

5. The actuator according to claim 4 further comprising a visual indicator stem disposed within the piston, the visual indicator stem being coupled to the cylinder.

6. The actuator according to claim 5 further comprising a visual stem window coupled to the actuator upper portion.

7. The actuator according to claim 4 further comprising a manual override mechanism disposed within the piston interior portion.

8. The actuator according to claim 7 wherein the manual override mechanism comprises an override stem disposed within the piston interior portion, the over-ride stem abutting the cylinder.

9. The actuator according to claim 8, wherein the manual override mechanism further comprises:

a bearing housing coupled to the piston cap portion;

a locking screw coupled to the override stem and the bearing housing;

a plurality of bearings coupled between the bearing housing and the locking screw; and a key coupled between the override stem and the piston interior portion.

10. The actuator according to claim 9 further comprising a visual indicator stem disposed within the piston, the visual indicator stem being coupled to the cylinder.

11. The actuator according to claim 10 further comprising a visual stem window coupled to the actuator upper portion.

12. The actuator according to claim 1 further comprising a quick disconnect mechanism disposed between the cylinder and the operating stem.

13. A fluid actuator, comprising:

an actuator housing having a top portion and a bottom portion;

a stationary piston fixedly coupled to the actuator housing top portion, the piston including an exterior surface, an external bottom surface, an upper cap region having a side, and a hollow interior portion;

a hollow cylinder disposed within the actuator housing proximate the piston exterior surface, the cylinder including an internal bottom surface, an exterior surface and an exterior upper region, the cylinder including a shoulder at the exterior upper region, wherein the internal bottom surface is the pressure-receiving surface; and an operating stem coupled to the cylinder, the operating stem being disposed within the actuator housing bottom portion.

14. The actuator according to claim 13, further comprising:

a spring disposed around the cylinder exterior surface within the actuator housing;

a spring plate coupled between the spring and the cylinder shoulder; and a bonnet assembly coupled to the actuator housing tower portion.

15. The actuator according to claim 13, further comprising a hydraulic pressure line disposed within the stationary piston, the hydraulic line extending between the piston bottom surface and the piston cap region side.

16. The actuator according to claim 15, wherein the hydraulic line includes a first portion and a second portion, the first and second portions being disposed with respect to one another at an angle of between about 55 and 125 degrees.

17. The actuator according to claim 13 further comprising a visual indicator stem disposed within the piston, the visual indicator stem being coupled to the cylinder.

18. The actuator according to claim 17 further comprising a visual stem window coupled to the actuator upper portion.

19. The actuator according to claim 13 further comprising a manual override mechanism disposed within the piston interior portion.

20. The actuator according to claim 19 wherein the manual override mechanism comprises an override stem disposed within the piston interior portion, the override stem abutting the cylinder.

21. The actuator according to claim 20 wherein the manual override mechanism further comprises:

a bearing housing coupled to the piston cap portion;

a locking screw coupled to the override stem and the bearing housing;

a plurality of bearings coupled between the bearing housing and the locking screw; and a key coupled between the override stem and the piston interior portion.

22. The actuator according to claim 13 further comprising a quick disconnect mechanism disposed between the cylinder and the operating stem.

23. An override mechanism for a hydraulic actuator having a stationary piston, the piston including an exterior surface, a hollow interior portion and an upper cap portion, the piston upper cap portion fixedly coupled to an actuator housing, the actuator including a hollow moveable cylinder disposed proximate the piston exterior surface, the override mechanism comprising:

an override stem disposed within the piston interior portion, the override stem abutting the cylinder.

24. The override mechanism according to claim 23, further comprising:

a bearing housing coupled to the piston cap portion;

a locking screw coupled to the override stem and the bearing housing;

a plurality of bearings coupled between the bearing housing and the locking screw; and a key coupled between the override stem and the piston interior portion.

25. The override mechanism according to claim 23 further comprising a visual indicator stem coupled to the cylinder.

26. A method of manufacturing a fluid actuator, comprising:

providing an actuator housing having a top portion and a bottom portion;

fixedly coupling a stationary piston to the actuator housing top portion, the piston including an exterior surface, a bottom surface, an upper cap region having a side, and a hollow interior portion;

forming a hydraulic pressure line within the stationary piston, the hydraulic line extending between the piston bottom surface and the piston cap region side;

disposing a hollow cylinder within the actuator housing proximate the piston exterior surface, the cylinder including an exterior surface and an exterior upper region, the cylinder including a shoulder at the exterior upper region;

coupling an operating stem to the cylinder within the actuator housing bottom portion;

disposing a spring around the cylinder exterior surface within the actuator housing;

coupling a spring plate between the spring and the cylinder shoulder; and coupling a bonnet assembly to the actuator housing lower portion.

27. The method according to claim 26, further comprising:

disposing a manual override mechanism within the piston hollow portion.

28. The method according to claim 27, wherein disposing a manual override mechanism comprises:

disposing an override stem within the piston interior portion, wherein the override stem abuts the cylinder.

29. The method according to claim 28, wherein disposing a manual override mechanism further comprises:

coupling a bearing housing to the piston cap portion;

coupling a locking screw to the override stem and the bearing housing;

coupling a plurality of bearings between the bearing housing and the locking screw; and coupling a key between the override stem and the piston interior portion.

30. The method according to claim 26, wherein forming a hydraulic pressure line further comprises forming a hydraulic line having a first portion and a second portion, the first and second portions being disposed with respect to one another at an angle of between about 55 and 125 degrees.

31. The method according to claim 26 further comprising coupling a visual indicator stem to the cylinder, the visual indicator stem being disposed within the piston.

32. The method according to claim 31 further comprising coupling a visual stem window to the actuator upper portion.

33. The method according to claim 26 further comprising coupling a quick disconnect mechanism between the cylinder and the operating stem.

* * * * *

UNITED STATES PATENT AND TRADEMARK OFFICE

CERTIFICATE OF CORRECTION

PATENT NO. : 6,487,960 B1
DATED : December 3, 2002
INVENTOR(S) : Chatufale

It is certified that error appears in the above-identified patent and that said Letters Patent is hereby corrected as shown below:

Column 5,
Line 26, "fall-closed" should read -- full-closed --.

Signed and Sealed this

Fifth Day of August, 2003

JAMES E. ROGAN
*Director of the United States Patent and Trademark Office*